United States Patent
Simpson et al.

[11] Patent Number: 6,042,800
[45] Date of Patent: Mar. 28, 2000

[54] CONTINUOUS METHOD OF REMOVING IMPURITIES FROM CRUDE SILVER NITRATE

[75] Inventors: Brian Leigh Simpson, Hamlin; Gary Michael Distefano, Rochester; Kevin Michael Logsdon, Holley; Stephen Michael Popham; Donald Charles Reid, both of Rochester, all of N.Y.

[73] Assignee: Eastman Kodak Company, Rochester, N.Y.

[21] Appl. No.: 08/174,497

[22] Filed: Dec. 28, 1993

[51] Int. Cl.⁷ .............................. C01B 21/48; C01G 5/00
[52] U.S. Cl. ............................................................. 423/395
[58] Field of Search ................................ 423/395, 27, 25, 423/42

[56] References Cited

U.S. PATENT DOCUMENTS

| | | | |
|---|---|---|---|
| 2,614,029 | 10/1952 | Moede | 423/25 |
| 3,141,731 | 7/1964 | Dietz | 423/395 |
| 3,554,883 | 1/1971 | Green | 423/395 |
| 3,623,817 | 11/1971 | Celio | 356/179 |
| 4,136,157 | 1/1979 | Asai et al. | 423/395 |
| 4,226,714 | 10/1980 | Furness et al. | 210/723 |
| 4,263,010 | 4/1981 | Randolph | 23/230 |
| 4,313,830 | 2/1982 | Tulin et al. | 210/639 |
| 4,336,143 | 6/1982 | Abbott | 210/740 |
| 4,726,896 | 2/1988 | Grove et al. | 209/166 |
| 4,731,176 | 3/1988 | Macdonald | 209/166 |
| 4,909,950 | 3/1990 | Katoh et al. | 210/788 |
| 4,978,506 | 12/1990 | Calderwood | 422/73 |
| 5,021,166 | 6/1991 | Torpey | 210/709 |
| 5,141,861 | 8/1992 | Dale | 435/162 |

FOREIGN PATENT DOCUMENTS

| | | | |
|---|---|---|---|
| 521047 | 1/1956 | Canada | 423/43 |

*Primary Examiner*—Steven Bos
*Attorney, Agent, or Firm*—Paul A. Leipold

[57] ABSTRACT

Herein is disclosed a continuous process for manufacturing purified silver nitrate solutions comprising the steps of:

a) transferring a crude silver nitrate solution, together with a slurry comprising silver oxide, to a multistage agitated reactor, thereby forming a mixture;

b) maintaining a continuous weight percent undissolved solids inside the reactor such that silver oxide is 10 to 80 weight percent of said undissolved solids;

c) transporting the first mixture through the reactor over a period of 15 minutes to 3 hours to form a reaction product; and d) filtering the reaction products through a continuous filter to form a silver nitrate filtrate.

12 Claims, 2 Drawing Sheets

CONTINUOUS METHOD OF REMOVING IMPURITIES FROM CRUDE SILVER NITRATE

FIELD OF THE INVENTION

This invention relates to the manufacture of silver nitrate.

BACKGROUND

Silver nitrate of high purity has many known uses. It is required for the manufacture of photographic materials, pharmaceuticals and catalysts. Silver nitrate is prepared by reacting metallic silver with nitric acid. The impurities in metallic silver remain in the resulting silver nitrate solution. The impurities include metals such as copper, iron, lead, nickel, tin, bismuth, zinc, chromium, manganese, antimony, cadmium, halides, phosphates, arsenates, selenium, etc.

Silver nitrate solution is often purified by batch treatment of the solution with silver oxide in agitated tanks for at least 1 to 8 hours. Flocculating agents are frequently used in the treatment. The batch is sampled and the pH measured. A pH of 6.0–6.2 was deemed acceptable to promote precipitation of impurities. Following this treatment period, the silver oxide solids are removed, along with precipitated and adsorbed impurities, typically by a gravity settling and filtration.

The reliability of pH measurement in concentrated silver nitrate solutions is quite poor. Dehydration of the pH electrode and fouling of the reference electrode cause pH measurement drift that prevents its use as a continuous measurement device.

The main disadvantage of batch methods is the high in-process inventory of materials required because of the long treatment times involves. Since a high inventory is required, batch purification is limited to use only in bypass or recycle streams in conjunction with multiple stages of crystallization to comprise a total process to produce photographic quality silver nitrate. Batch processes also require relatively large batch tanks.

SUMMARY OF THE INVENTION

The present invention provides a continuous process for manufacturing purified silver nitrate solutions comprising the steps of:

a) transferring a crude silver nitrate solution, together with a slurry comprising silver oxide, to a multistage agitated reactor, thereby forming a mixture;

b) maintaining a continuous weight percent undissolved solids inside the reactor such that silver oxide is 10 to 80, preferably 50, weight percent of said undissolved solids;

c) transporting the first mixture through the reactor over a period of 15 minutes to 3 hours, preferably 30 to 60 minutes, to form a reaction product;

d) filtering the reaction products through a continuous filter to form a silver nitrate filtrate and a retentate; and e) recycling the retentate to the reactor.

The term "retentate" refers to a slurry of solids that is separated from the filtrate by the filter.

The above process, when applied to crude silver nitrate is referred to as a silver oxide neutralization treatment. The resulting silver nitrate filtrate can be further purified by subjecting it to the foregoing process a second time, except that a flocculating agent is used in step a) with the silver oxide. This latter treatment is referred to in the art as a flocculation treatment.

The process is continuous and thus avoids the problems cited above encountered with batch processes. The quality of silver nitrate obtained from the silver nitrate filtrates of this invention is of consistently high quality. A significant reduction in the in-process silver inventory is realized. Continuous operation results in small tank volume requirements for the process equipment as compared to batch processing.

The process of the invention allows the entire production of a silver nitrate purifying plant, including any recycle streams, to be processed with both a silver oxide neutralization treatment and a flocculating reagent treatment, to be processed with a practical inventory. Previously, only a portion of the plant's production could be so treated.

The silver nitrate filtrate fed to a silver nitrate crystallizer is of improved quality, thereby resulting in higher quality silver nitrate crystals and requires only one stage of purification.

DETAILS OF THE INVENTION

Crude silver nitrate solution is formed by mixing nitric acid and crude silver in a vessel in the presence of heat as is done conventionally. Such a process is described for example in U.S. Pat. No. 5,000,928. The silver used as starting material can come from a variety of sources, and any of a very large number of metallic contaminants, as well as nonmetallic impurities, may be associated therewith. Silver bars having a purity of 99.0 to 99.99 percent serve as a useful starting material.

Additionally the crude silver nitrate solution may have nitrites removed before being subjected to the process of this invention. Such a process is disclosed in U.S. Ser. No. 821,666 filed January 1992 in the name of Chefalo et al and entitled PROCESS OF REMOVING NITRITE FROM A SILVER NITRATE SOLUTION. This application is expressly incorporated herein by reference.

Figure 1:
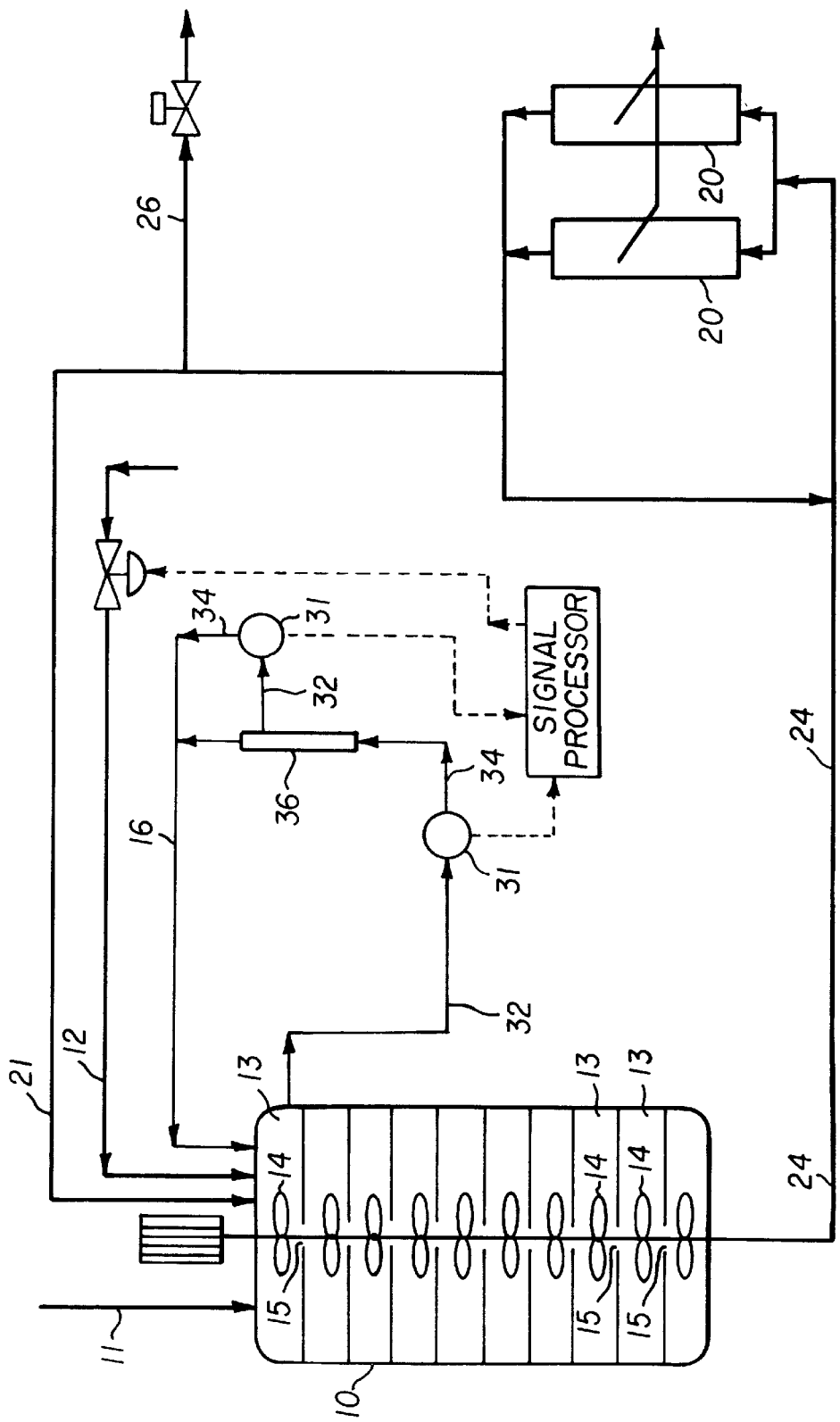
FIG. 1 is a schematic of the silver nitrate solution process in its entirety.

FIG. 1 is a schematic diagram of the continuous process of separating impurities from crude silver nitrate solutions that is the subject of this invention. The process is made continuous by the use, in combination, of a continuous multistage agitated reactor such as the multistaged agitated reactor column 10, continuous filtration elements 20, control of weight percent undissolved solids in the reactor, elevated heat in the reactor column and recycle of retentate (slurry of filter solids). Other useful reactors include multiple continuous stirred tank reactor in series. An example of a continuous filter is a continuous cross flow filter. Weight percent solids can be control with a novel differential densitometers 31. In the separation process crude silver nitrate is delivered continuously to the top of reactor column 10 through line 11. At the same time a slurry comprising an alkalizing agent such as silver oxide is delivered to the top of the reactor through line 12. Other useful alkaline agents include: alkali metal hydroxides such as sodium hydroxide, potassium hydroxide and lithium hydroxide. Addition of an alkaline agent, such results in precipitation of metallic contaminants in various forms as is well known in this art.

The continuous multi-staged agitated reactor column replaces the batch reactor tanks used in prior art methods of removing impurities from crude silver nitrate solutions. This kind of reactor is known in the chemical processing industry, but its use in purifying silver nitrate is novel. This type of reactor allows continuous processing to be done without incurring a high inventory cost. Reaction times of 30 minutes to 60 minutes are preferred. Reaction times of 15 minutes to 3 hours can also be used. The reactor column consists of several separate mixing compartments or stages 13. Each stage has its own mixing impeller 14. The stages are connected to each other through opening 15 that traverse the entire reactor. The crude silver nitrate and silver oxide slurry are mixed in the first stage and continuously mixed in each stage in the reactor column as the mixture passes down the column through opening 15. Total residence time of the mixture of crude silver nitrate and silver oxide slurry is from 15 minutes to 3 hours and usually 30 to 60 minutes. Total residence time will depend upon the level of impurities in the crude silver nitrate, reaction rates in the column and the temperature at which the reactions are conducted. During the residence time the reactor column is maintained at temperatures up to the boiling point of the mixture. Generally temperatures in the range of 40 to 80° C. will be useful. Elevated temperatures greatly enhance the rate of precipitation and adsorption of impurities. This helps to minimize the working inventory of crude silver nitrate solution required in prior art processes.

The mixture in the reactors comprises crude silver nitrate solution, solid silver oxide and other solids that are fed into the top of reactor column 10 through slurry return line 21 from the filtration process discussed in detail below. We have found that maximum reaction rates and precipitation of impurities are enhanced by maintaining 0.5 to 8 weight percent undissolved solids, preferably 2 weight percent, throughout the entire reactor column during the process. This range of weight percent undissolved solids are designed to maintain 10 to 80 percent by weight silver oxide in the undissolved solids. This means that the silver oxide content, as weight percent silver oxide in the undissolved solids, can range from 0.05 to 6.5 preferably 0.2 to 1.6 weight percent silver oxide. The silver oxide content of the slurry is determined off line as frequently as necessary to maintain the target silver oxide content.

This targeted weight percent of undissolved solids is maintained continuously using a differential density instrument programmed in combination with a computerized signal processor conventionally used to control chemical processes. The instrument, in conjunction with the controller uses commercially available separators and densitometers to separate a clarified solution from the process stream, and to calculate the difference in density between the whole and the clarified slurries. The difference in density is then proportional to the concentration of solid reagents in the reactor. Two density measurements are required because a single measurement cannot distinguish between dissolved and undissolved solids. This type of analyzer gives a real-time analysis of the reaction mixture to allow close control of the process. The controller is a conventional signal processor programmed to adjust the amount of silver oxide fed to the reactor column through lines 12.

In FIG. 1 a schematic drawing is presented of an on-line arrangement of a differential densitometer for maintaining a targeted weight percent undissolved solids in chemical processor. The method, and differential densitometer is the invention of co-worker Thomas Prevost and is the subject of a patent application filed on the same date as the present case. In the method on-line determination of weight percent undissolved solids is accomplished by measuring the weight percent undissolved solids in the mixture in the first stage of the reactor column. This is done by first measuring the density of the whole mixture, filtering the mixture and then measuring the density of the resulting filtrate. The difference in density is proportional to the undissolved solids present in the mixture.

Figure 2:
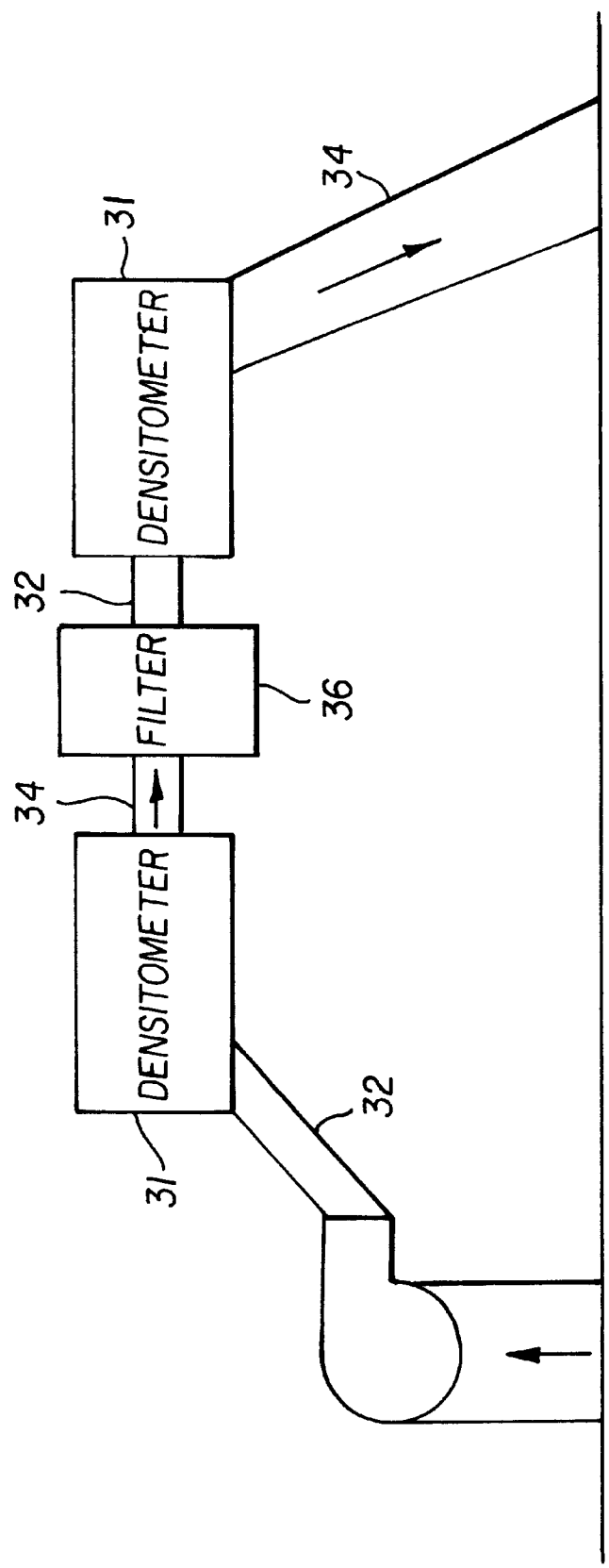
FIG. 2 is a schematic of a differential density densitometer used in the process.

In FIG. 2 a schematic of the apparatus of FIG. 1 is shown for obtaining the differential density measurement. The apparatus consists of a first densitometer 31 having inflow and outflow means 32 and 34, and a second densitometer 31, having similar inflow means 32 and outflow means 34. Outflow means 34 of the first densitometer 31 is fluidly connected to a filter 36, preferably a crossflow filter. The filter is fluidly connected to outflow means 34 of the first densitometer. The filter 36 and the outflow means 34 of the second densitometer are connected to a return line 16 (not shown) that returns the sample to the reactor column. This arrangement provides for real time on-line measurement of density continuously as the reaction mixture moves through the reactor column.

Referring again to FIG. 1, a sample of the mixture from the first stage of the reactor column is pumped via inflow means 32 through the first densitometer 31 where a first density reading is taken and fed electronically to the signal processor . The sample is then pumped via out flow means 34 though filter 36 to remove undissolved solids. The removed undissolved solids are pumped to line 16. The filtrate is pumped into the second densitometer 31 where a second density reading is taken and fed electronically to the signal processor. The filtrate is then pumped back to return line 16. Many densitometers are available commercially which can be used in this process. This densitometer measures density of a solution flowing through it and a 4–20 milliamps signal which is proportional to the density is sent to the signal processor. The signal processor computes the difference in densitometer readings and compares that difference to a look up table or digitally compares the values to a pre-established calibration and then adjusts the input of the silver oxide slurry into the reactor column according to a pre-established target value that adjusts weight percent undissolved solids to the concentration targeted for the process of this invention.

The reaction mixture emerges from the bottom of reactor column 10 through line 24 and is pumped continuously through line 24 to a pair of cross flow filters. The settling and batch filtration separation steps of batch processes of the prior art are replaced by continuous cross flow filtration. Any cross flow filter arrangement will be useful. The filtering process produces a first silver nitrate solution. Cross flow filters are known in the art and are available commercially from a variety of sources. Continuous filtration significantly reduces the in process silver inventory required in prior art batch methods. Cross flow filtration is superior to the settling and filtering arrangement used in the prior art batch methods. It produces more particulate free silver nitrate solution and therefore fewer impurities in the filtered silver nitrate solution. Moreover, cross flow filtration promotes good filtrate flux rate. This is surprising due to the fast fouling rates observed with cake filtration equipment. The preferred filter is a crossflow ceramic membrane filter. This type of filter has the advantage of being highly corrosion resistant at the temperature required to operate the reactions at good reaction rates.

Continuous filtration produces the retentate which is a slurry mixture of silver nitrate solution, silver oxide solids and impurity solids. This retentate contains a higher weight percent undissolved solids than that leaving the multi-stage reactor column. The concentration of undissolved solids in the filter is controlled by returning retentate to the top of the multi-stage reactor via line 21. This allows for reuse of silver oxide that has not been reacted, provides buffer from process upsets and raises the solids concentration into a range that can be measured. A portion of the retentate is also purged from the process through line 26 such that silver oxide is 10 to 80 weight percent of the total undissolved solids. This purge is critical for controlling the amount of undissolved silver oxide solids in the system and the most consistent operation is obtained when the rate of undissolved impurity solids accumulated equals the rate at which undissolved impurity solids are purged.

The first silver nitrate solution may be subjected to a second continuous purification treatment that is substantially similar to the above process. This includes subjection to a second multi-stage agitated reactor, control of weight percent undissolved solids and filtration. In this second purification a slurry containing both silver oxide and a flocculent, such as ferric nitrate, ferric oxide, iron powder and the like, is fed to the reactor column with the first silver nitrate solution.

Silver nitrate can be crystallized from both the first or second silver nitrate solution according to crystallization procedures known in the art. Such procedures are disclosed in U.S. Pat. No. 5,000,928 and now allowed U.S. Ser. No. 848478 filed Mar. 9, 1992 in the name of Hennenkamp et al and entitled SILVER NITRATE PRODUCED BY A CONTINUOUS EVAPORATIVE CRYSTALLIZATION PROCESS. The latter patent and patent application are expressly incorporated herein by reference The invention has been described in detail with particular reference to preferred embodiments thereof, but it will be understood that variations and modifications can be effected within the spirit and scope of the invention.

We claim:

1. A continuous process for manufacturing purified silver nitrate solutions comprising the steps of:

a) transferring a crude silver nitrate solution, together with a slurry comprising silver oxide, to a multistage agitated reactor , thereby forming a mixture;

b) maintaining a continuous weight percent undissolved solids inside the reactor of such that silver oxide is 10 to 80 weight percent of said undissolved solids;

c) transporting the mixture through the reactor over a period of 15 minutes to 3 hours to form a reaction product;

d) filtering the reaction product through a continuous filter to form a silver nitrate filtrate and a retentate; and e) recycling the retentate to the reactor.

2. The process of claim 1 comprising the further step of adding flocculating agent in step a).

3. The process of claim 1 or 2 wherein the weight percent undissolved solids inside the reactor is maintained such that silver oxide is 50 weight percent of said weight percent solids.

4. The process of claim 2 wherein the flocculating agent is ferric nitrate.

5. The process of claim 1 or 2 wherein the mixture is transported through the reactor over a period of 30 to 60 minutes.

6. The process of claim 1 or 2 wherein the temperature in the reactor is maintained at a temperature of 40° C. up to boiling point of the mixture.

7. The process of claim 6 wherein the temperature in the reactor is maintained in the range 40 to 80° C.

8. The process of claim 1 or 2 wherein the rate of impurity undissolved solids produced in the process equals the rate at which the impurity undissolved solids are purged from the process.

9. The process of claim 1 or 2 wherein the continuous filter is a ceramic cross flow filter.

10. The process of claim 1 or 2 wherein the reactor is a multi-staged agitated reactor column.

11. The process of claim 1 or 2 wherein the continuous filter is a cross flow filter.

12. The process of claim 1 or 2 wherein step b) is carried out using a differential densitometer.

\* \* \* \* \*